Aug. 1, 1961 S. P. TSCHAPPAT 2,994,549
PACKING GLANDS
Filed July 11, 1958

INVENTOR.
Sheridan P. Tschappat
BY
P. M. McKnight
ATTORNEY

2,994,549
PACKING GLANDS
Sheridan P. Tschappat, P.O. Box 286, Tulsa, Okla.
Filed July 11, 1958, Ser. No. 747,936
1 Claim. (Cl. 288—19)

This invention relates to improvements in packing glands, and more particularly, but not by way of limitation, to a novel oil trap conical shaped packing gland for utilization with stuffing boxes for oil well polished rods, and the like.

Many of the producing oil wells in this country and other parts of the world do not have sufficient well bore pressure to provide a natural flow of the well fluid. The fluid from these wells is frequently produced by the use of a rod type pump. The pumping unit is usually installed at the bottom of the well bore and is actuated by a string of rods extending downwardly from the surface of the ground. The uppermost rod which projects above the ground from the well head is normally called the polished rod. A stuffing box is usually secured to the well head around the polished rod in order to prevent leakage of the pumped oil around the rod as the rod reciprocates within the well head. The packing glands in the stuffing box are disposed around the polished rod and function to wipe the outer periphery thereof as well as prevent fluid leakage during the reciprocation of the rod. It is very desirable, however, to maintain a lubrication between the packing glands and the polished rod in order to reduce the friction therebetween and prevent undue burning or wear of the packing glands.

The present invention contemplates a novel split cone packing ring member having a plurality of recess portions provided on the inner periphery thereof adjacent the polished rod. The recesses function to trap a portion of the oil or well fluid as the polished rod reciprocates within the stuffing box during the pumping action. The small accumulation of the oil in the recesses maintains a coating thereof on the outer periphery of the rod to provide an efficient lubrication between the rod and the packing gland. It will be apparent that the friction therebetween is thus greatly reduced to facilitate the operation of the polished rod and prolong the life of the packing gland. In addition, each of the recesses is provided with a slit extending into the body of the packing gland in order to drain a portion of the trapped oil into the interior of the packing gland itself, thereby providing a lubrication of the packing gland material. This facilitates the operation of the packing gland by reducing or substantially eliminating any undue drying out of the packing material. The novel packing gland is simple and efficient in operation and economical and durable in construction.

It is an important object of this invention to provide a packing gland for an oil well stuffing box whereby the operation thereof may be greatly facilitated.

It is another object of this invention to provide a novel packing gland for an oil well stuffing box which is so designed and constructed to assure an efficient lubrication of the polished rod during the reciprocation thereof within the stuffing box.

Another object of this invention is to provide a novel packing gland for an oil well stuffing box which is so designed and constructed to provide a self lubrication of the packing material for increasing the efficiency and prolonging the life thereof.

Still another object of this invention is to provide a novel packing gland which is simple and efficient in operation and economical and durable in construction.

Other objects and advantages of the invention will be evident from the following detailed description, read in conjunction with the accompanying drawings, which illustrate my invention.

Figure 1:
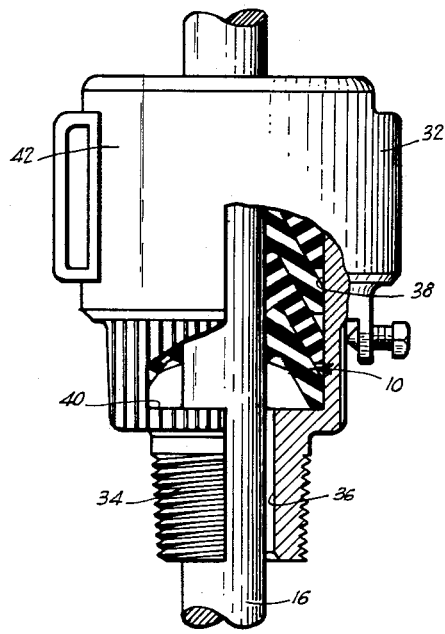
FIGURE 1 is a side elevational view partly in section of a stuffing box provided with a plurality of packing glands embodying the invention.
Figure 2:
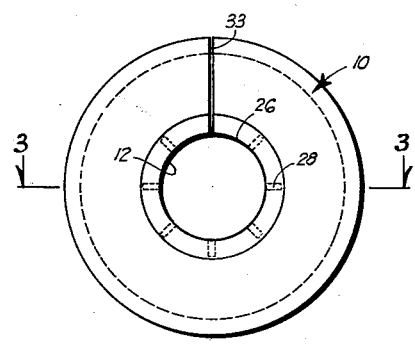
FIGURE 2 is a plan view of a packing gland embodying the invention.
Figure 3:
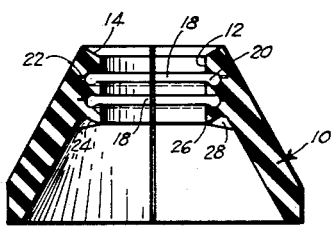
FIGURE 3 is a sectional view taken on line 3—3 of FIG. 2.

Referring to the drawings in detail, reference character 10 refers in general to a substantially conical shaped packing gland preferably constructed of a suitable resilient material, such as rubber, neoprene, or the like, but not limited thereto. The packing member 10 is provided with a centrally disposed cylindrical bore 12 having a countersunk portion 14 at the upper end thereof, as viewed in FIG. 3. The bore 12 is of a diameter substantially the same as the outer diameter of an oil well polished rod 16 (FIG. 1) for a purpose as will be hereinafter set forth. A plurality of annular recesses 18 are longitudinally spaced on the inner periphery of the bore 12 below the counter-sunk portion 14 for trapping fluid (not shown) therein. Each of the recesses 18 is provided with an enlarged or bulbous outer circumferential portion 20 for retaining a portion of the trapped fluid therein. An annular slit 22 extends radially outward from each of the bulbous portions 20 for dispersing the fluid into the interior of the packing gland 10.

The packing gland 10 is provided with diverging side walls 24 adjacent the lower end of the bore 12 to provide a substantially knife edged wiping portion 26 adjacent the polished rod 16 for a purpose as will be hereinafter set forth. A plurality of radially extending strengthening webs or re-enforcing ribs 28 are circumferentially spaced around the diverging side walls 24 to strengthen the wiping edge 26.

The outer periphery of the packing gland 10 is provided with a substantially cylindrical or straight sided portion 30 oppositely disposed from the bore 12 in order to engage the inner periphery of a stuffing box, generally indicated at 32. The gland 10 is provided with a longitudinal slit 33 extending throughout the length thereof for facilitating the disposition of the gland around the polished rod 16.

The stuffing box 32 is normally provided with a reduced sleeve portion 34 having external threads thereof for securing the stuffing box to a well head (not shown). The diameter of the internal bore 36 of the sleeve 34 is larger than the outer diameter of the polished rod 16 to provide for an unencumbered reciprocation of the polished rod 16 therein. The stuffing box 32 is provided with an enlarged inner diameter 38 above the sleeve 34, thereby forming an internal circumferential shoulder 40 adjacent the bore 36. A plurality of the packing glands 10 may be superimposed within the enlarged portion 38, whereby the lowermost packing gland 10 will rest on the shoulder 40 for supporting the remaining glands 10 thereabove. It will be apparent that the cylindrical portion 30 will thus be in sealing contact with the inner periphery of the enlarged portion 38, whereas the bore 12 will be disposed in engagement with the outer periphery of the polished rod 16. A packing gland follower 42 is usually provided on the stuffing box 32 for exerting a pressure on the packing glands 10 to maintain an efficient seal between the rod 16 and the stuffing box 32, as is well known.

*Operation*

A plurality of the split cone packing rings 10 may be readily disposed around the polished rod 16 in a superimposed position within the enlarged portion 38 of the stuffing box 32. The cylindrical portion 30 of the glands 10 will thus be disposed in a sealing engagement with the inner periphery of the enlarged portion 38 to provide an efficient sealing thereof against leakage of well fluid (not shown). The bore 12 of the glands 10 will bear against the outer periphery of the polished rod 16. As the polished rod is reciprocated in the stuffing box 32 during the well pumping operation, the bore 12 will wipe the outer periphery of the polished rod to substantially preclude leakage of the well fluid therearound. However, it will be apparent that a portion of the well fluid being wiped from the polished rod will be trapped in the annular recesses 18. Thus, a constant lubrication will be maintained between the packing glands 10 and the polished rod 16, thus greatly reducing the friction therebetween.

In addition, a portion of the trapped fluid will be retained within the bulbous portions 20 whereby the fluid will move through the slits 22 for impregnating the material of the packing gland with a lubricant. This functions to retain the resiliency of the packing gland material, and substantially reduces undue drying out and brittleness thereof to greatly prolong the useful life of the glands.

The wiping edge 26 of the gland 10 efficiently wipes the outer periphery of the polished rod 16 during the reciprocation thereof. The re-enforcing ribs 28 retain the wiping edge 26 firmly in contact with the polished rod and substantially preclude any tearing or breaking thereof. The counter-sunk portion 14 at the top of each gland 10 will be disposed around the wiping edge 26 of the gland 10 disposed thereabove, thereby providing clearance therefor to preclude interference between the adjacent packing glands superimposed within the stuffing box 32.

From the foregoing, it will be apparent that the present invention provides a novel conical shaped packing gland for oil well stuffing boxes wherein an efficient lubrication is provided during the reciprocation of the polished rod therein. The oil trapped within the annular recesses of the packing gland not only lubricates the outer periphery of the polished rod to reduce the friction therebetween, but also provides a self lubricating feature for impregnating the material of the packing glands for retaining the resilience thereof during utilization. The novel packing glands greatly facilitate the operation of the polished rod, and greatly prolong the useful life of the packing glands of the stuffing box. The novel packing glands are simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A packing gland for an oil well stuffing box having a polished rod reciprocably disposed therethrough, and comprising a substantially conical shaped body member, an internal bore provided in the body member adapted for disposition around the polished rod, a plurality of spaced annular recesses provided on the bore for trapping well fluid therein, said trapped fluid providing lubrication between the packing gland and polished rod, an enlarged circumferential portion provided for the annular recesses for retaining a portion of the well fluid therein, and a radially extending annular slit portion provided from each of the enlarged portions for directing a portion of the retained fluid into the body member for an impregnation thereof.

References Cited in the file of this patent

UNITED STATES PATENTS

| | | |
|---|---|---|
| 1,875,936 | Saunders | Sept. 6, 1932 |
| 2,351,343 | Kelley | June 13, 1944 |
| 2,564,912 | McKissick | Aug. 12, 1951 |
| 2,721,748 | Tremolada | Oct. 25, 1955 |